US006067863A

United States Patent [19]

Favre et al.

[11] Patent Number: 6,067,863

[45] Date of Patent: May 30, 2000

[54] MULTIPLE-FUNCTION SELECTOR UTILIZING A FORCE SENSITIVE, VARIABLE IMPEDANCE DEVICE

[75] Inventors: Patrick Favre, Obernai, France; Ruth E. Hubbell, Milwaukee, Wis.; Igor A. Shmulevich, Fox Point, Wis.; Narayanarao Jayasimha, Greenfield, Wis.; Matthew G. Rhinehart, Pewaukee, Wis.; Joseph E. Khoury, Farmington Hills, Mich.

[73] Assignee: Eaton Corporation, Cleveland, Ohio

[21] Appl. No.: 08/920,912

[22] Filed: Aug. 29, 1997

[51] Int. Cl.[7] ........................ G01L 1/16

[52] U.S. Cl. ........................ 73/862.68; 341/34

[58] Field of Search ........................ 73/862.046, 865.5, 73/865.7, 862.68; 338/47; 340/407.1, 407.2, 626; 341/34

[56] References Cited

U.S. PATENT DOCUMENTS

| | | | |
|---|---|---|---|
| 3,611,068 | 10/1971 | Fujita | 317/235 R |
| 3,710,050 | 1/1973 | Richards | 200/61.43 |
| 4,120,828 | 10/1978 | Michalchik | 252/513 |
| 4,258,100 | 3/1981 | Fujitani et al. | 428/315 |
| 4,273,697 | 6/1981 | Sumimura et al. | 260/37 |
| 4,314,227 | 2/1982 | Eventoff | 338/99 |
| 4,347,505 | 8/1982 | Anderson | 340/666 |
| 4,441,097 | 4/1984 | Anderson | 340/365 |
| 4,489,302 | 12/1984 | Eventoff | 338/99 |
| 4,493,219 | 1/1985 | Sharp et al. | 73/862.04 |
| 4,510,079 | 4/1985 | Kawai et al. | 252/511 |
| 4,518,648 | 5/1985 | Miyata et al. | 428/256 |
| 4,794,365 | 12/1988 | Dunbar | 338/47 |
| 4,929,804 | 5/1990 | Kawai et al. | 200/5 |
| 5,302,936 | 4/1994 | Yaniger | 338/47 |
| 5,510,783 | 4/1996 | Findlater et al. | 341/34 |
| 5,510,784 | 4/1996 | Polaert et al. | 73/865.7 |
| 5,581,484 | 12/1996 | Prince | 364/559 |
| 5,828,289 | 10/1998 | Burgess | 338/47 |

FOREIGN PATENT DOCUMENTS

| | | | |
|---|---|---|---|
| 2 159 953A | 12/1985 | United Kingdom | G01B 7/30 |
| 95/20233 | 7/1995 | WIPO . | |
| 95/22828 | 8/1995 | WIPO . | |

*Primary Examiner*—George Dombroske
*Assistant Examiner*—Jewel V. Thompson
*Attorney, Agent, or Firm*—Quarles & Brady LLP

[57] ABSTRACT

An electrical switch assembly includes a member by which a user selects one of a plurality of functions. Operation of the member applies different amounts of pressure to a transducer that has an impedance which changes in response to the applied pressure. An input circuit produces an output voltage which varies in relation to changes in the impedance of the pressure transducer. A voltage comparator compares the output voltage to a plurality of voltage ranges and in response to the voltage comparison, an output driver produces at least one electrical signal that indicates which one of plurality of functions the user has selected.

15 Claims, 3 Drawing Sheets

MULTIPLE-FUNCTION SELECTOR UTILIZING A FORCE SENSITIVE, VARIABLE IMPEDANCE DEVICE

BACKGROUND OF THE INVENTION

The present invention relates to electrical switches for selecting one of a plurality of functions, and to circuits which employ pressure responsive, variable impedance devices.

A wide variety of electrical equipment allow the user to select among several functions or operating modes. For example, the instrument panel of an automobile provides one switch that allows the user to select which of several external lights should be turned on, and other switches to select the mode of operation and fan speed of the heater/air conditioner.

Often the selector device is a rotary switch in which a movable contact is connected to a knob. When the user rotates the knob, the movable contact sequentially engages different stationary contacts, each of which is associated with a circuit for a different function to be selected. One of the drawbacks of such mechanical contact switches is that the contacts wear with usage and corrode with the passage of time. Therefore, it is desirable to provide a non-mechanical contact mechanism for selecting among the different functions.

Automobiles also provide switches that enable the driver to control motors which raise and lower the windows. A lever or rocker actuated switch typically is mounted on the inside surface of the door, by which the driver or passengers control a motor to position the window. Although the switch may directly control the application of electricity to the motor, often different positions of the switch merely provide an input signal to a motor control circuit. In one switch position, the control circuit energizes the motor to lower the window only while the user holds the switch in that position and the motor stops whenever the user releases the switch lever. When the user places the switch in an express-down position, the motor controller responds by activating the motor continuously until the window is in the fully lowered position, even if the user releases the switch lever before the window reaches the fully lowered position. The express down feature is particularly useful when using a drive-up window or toll booth in which case the window can be fully lowered with a single, quick motion of the control switch without having to hold the switch while the window slowly lowers. A similar set of control switch positions also are provided for manual and express raising of the window.

SUMMARY OF THE INVENTION

A general object of the present invention is to provide a multiple function selector switch which does not rely upon mechanical switch contacts.

Another object of the present invention is to provide a multiple function selector mechanism which utilizes a pressure sensitive, variable impedance device to select among the available functions.

These and other objectives are satisfied by a selector switch assembly that includes a pressure transducer having an impedance which changes in response to applied pressure. A member, when operated by a user, applies varying pressure to the pressure transducer. Preferably the member has a plurality of positions at each of which a different amount of pressure is exerted upon the transducer. A circuit, connected to the pressure transducer, produces an electrical signal in response to the impedance of the pressure transducer and that electrical signal has a plurality of discrete states which indicate a like plurality of functions which the user is able to select.

In the preferred embodiment of the present invention, the circuit comprises an input section which produces an output voltage that varies with changes in the impedance of the pressure transducer. A voltage comparator compares the output voltage to a plurality of voltage thresholds that correspond to the plurality of functions which the user is able to select. Preferably each function is associated with a discrete range of voltages that are discontinuous to provide better discrimination among the various functions that are being selected.

DETAILED DESCRIPTION OF THE INVENTION

Figure 1:
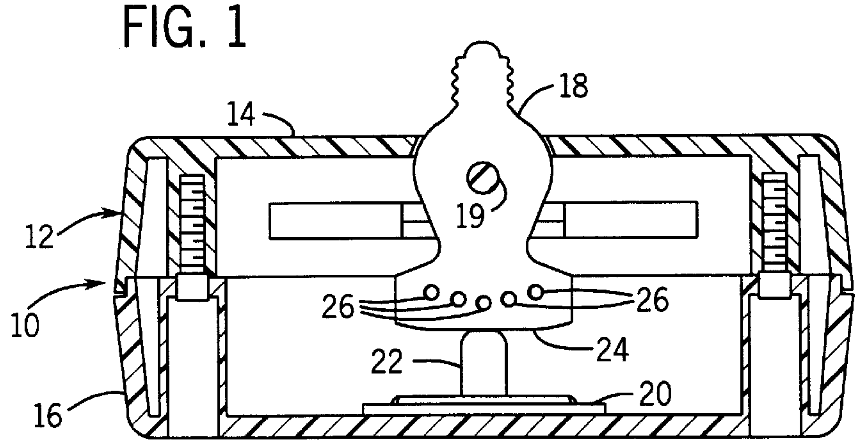
FIG. 1 is a cross-sectional view through a selector switch which incorporates a pressure sensitive, variable impedance device, also referred to as a pressure input device (PID)

With initial reference to FIG. 1, a selector switch 10 comprises a case 12 formed by an upper portion 14 and a lower portion 16 held together by screws. The upper portion 14 has an aperture in one major surface through which a selector lever 18 extends being pivotally mounted within the case 12 by a shaft 19. The lower portion contains a pressure-responsive, variable impedance device 20, also referred to as a pressure input device or PID. An actuator member 22 is positioned against the PID 20 and is in contact with a surface 24 of the selector lever 18.

The selector lever 18 has five detents 26 arranged in an arc below the pivot shaft 19 of the lever. A spring catch (not shown) in the lower portion 16 of the case 12 engages the detents to provide tactile feedback to an operator of the selector switch 10 indicating when the selector lever 18 is in one of five positions. The center position, illustrated, is the neutral or off-state of the selector switch. The user is able to move the selector lever 18 in either the clockwise or counterclockwise direction from the center position into two other positions on each side thereof. In each of those positions the catch engages one of the detents to provide tactile feedback to the user. The lever may be attached to a spring mechanism that return the lever to the center position when released by the user. The lever surface 24 has a contour such that at each of the five detent positions a different amount of pressure, or force, is applied via the actuator 22 to the PID 20. The application of that pressure compresses the PID against an interior surface of the case 12. In the center position, zero or negligible force is applied to the PID 20. Although the present invention is being described in the context of a lever-type selector switch, other mechanical mechanisms, such as a rotary switch, can be utilized to exert different pressure levels onto the PID 20 in each of several unique selector positions.

Figure 2:
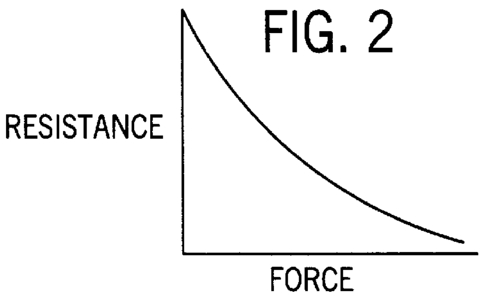
FIG. 2 graphically illustrates the relationship between force supplied to one type of PID and the resistance of that device.

The PID 20 may be any of several commonly available devices having an impedance which varies with the amount of pressure applied to the device. For example, one type of PID has a resistance which varies with force, as graphically depicted in FIG. 2. Specifically, the resistance at zero force is a very large value with the resistance decreasing with increasing amounts of pressure applied to the PID. These pressure sensitive resistance devices are commercially available, such as those supplied by Interlink Electronics, Inc. of Camorillo, Calif., and described in U.S. Pat. No. 5,302,936.

Figure 3:
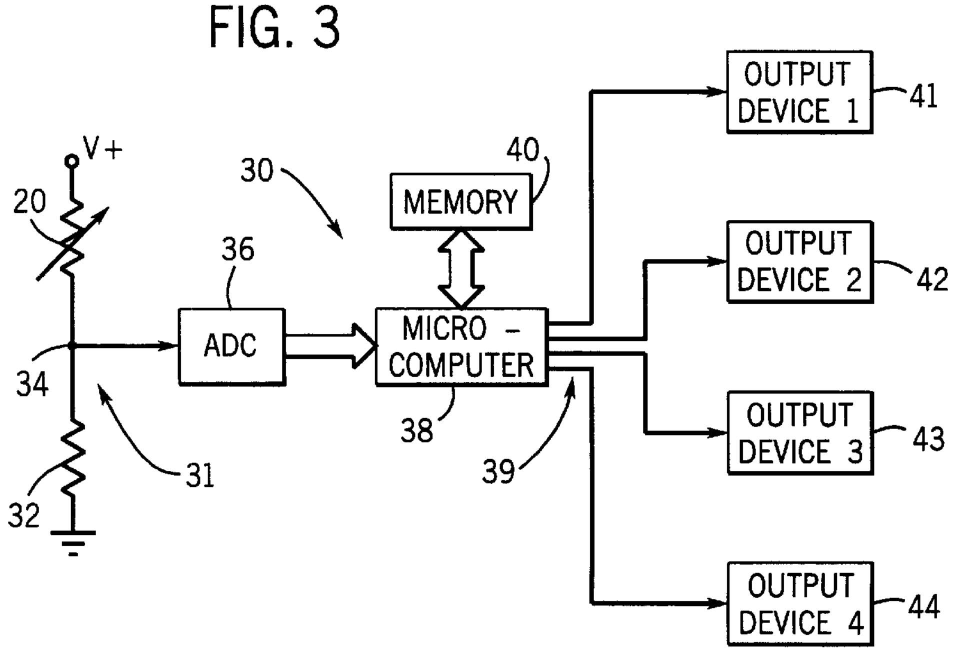
FIG. 3 is a block schematic diagram of a multiple function selector incorporating the PID.

With reference to FIG. 3, the PID 20 may be utilized as an input device of a control circuit 30 by connecting the PID as part of a voltage divider in an input circuit 31. Specifically, the PID 20 is connected in series with a reference resistor 32 between a positive voltage $V^+$ and ground of the motor vehicle, for example. As will be described, changes in resistance of the PID 20 varies the voltage drop across the reference resistor 30, as shown graphically in FIG. 4. A node 34 between the PID 20 and the reference resistor 32 is connected to the input of an analog-to-digital converter (ADC) 36. The ADC 36 produces a digital value corresponding to the voltage level at node 34.

That digital voltage value is applied to a conventional microcomputer 38 which contains the internal microprocessor, read-only memory, random access memory, input/output circuits and clock circuits. If required additional external memory 40 can be provided. The microcomputer 38 may be a device which is dedicated solely to the control circuit 30 or may be a microcomputer which is already present in a motor vehicle for controlling several other functions.

In the exemplary control circuit 30, individual lines of a parallel output port 39 of the microcomputer 38 are connected to a plurality of output devices 41, 42, 43 and 44. The number of output devices corresponds to the number of positions of the lever 18 of the selector switch 10. For example, with a selector switch 10 as shown in FIG. 1 that has a center-off position, the four other positions enable selection among four output devices 41–44. One skilled in the art will recognize that different numbers of switch positions can be provided to control a different number of output devices, and that the switch may be configured with an off position at one extreme rotational position or without an off position depending upon the control application.

Figure 4:
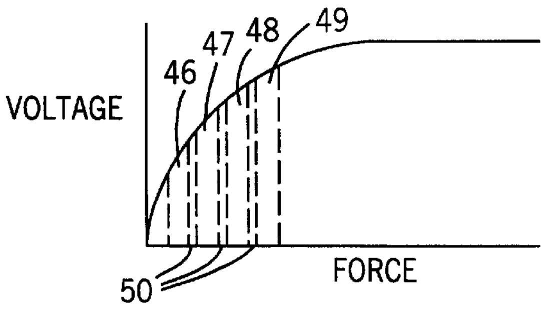
FIG. 4 graphically depicts the relationship between the force supplied to the PID and a voltage level produces in the circuit of FIG. 3.

With four different output devices being controlled, each output device 41–44 is assigned one of the positions of the selector lever 18. Because the actual voltage produced at node 34 for each lever position may vary with variation of supply voltage $V^+$ and with climatic conditions, a voltage range 46, 47, 48 or 49, as shown in FIG. 4, is assigned to each lever position. When the voltage at node 34 is within one of these voltage ranges 46–49, the circuit 30 is able to determine which output device function is being selected by the user. A dead band 50 is located between the voltage ranges 46–49 to enhance the ability to discriminate between adjacent voltage ranges. Thus the four voltage ranges 46, 47, 48 or 49 are discontinuous. The first voltage range 46 also is spaced from the zero level to accommodate voltage fluctuation when the switch 10 is in the center-off position.

Thus, when the user desires a particular function, as performed by one of the output devices 41–44, the user places the selector lever 18 in the corresponding physical position. At each of those positions, a different pressure is exerted on the PID 20 which varies the resistance so that the voltage produced at node 34 in the control circuit 30 is within the specific voltage range 46–49 that corresponds to the lever position. That voltage level is converted into a digital value by the analog to digital converter 36. Periodically, the microcomputer 38 reads the output value from the analog to digital converter 36. This can be accomplished by the microcomputer 36 executing a software routine upon the occurrence of a timed interrupt, every 100 milliseconds, for example.

Figure 5:
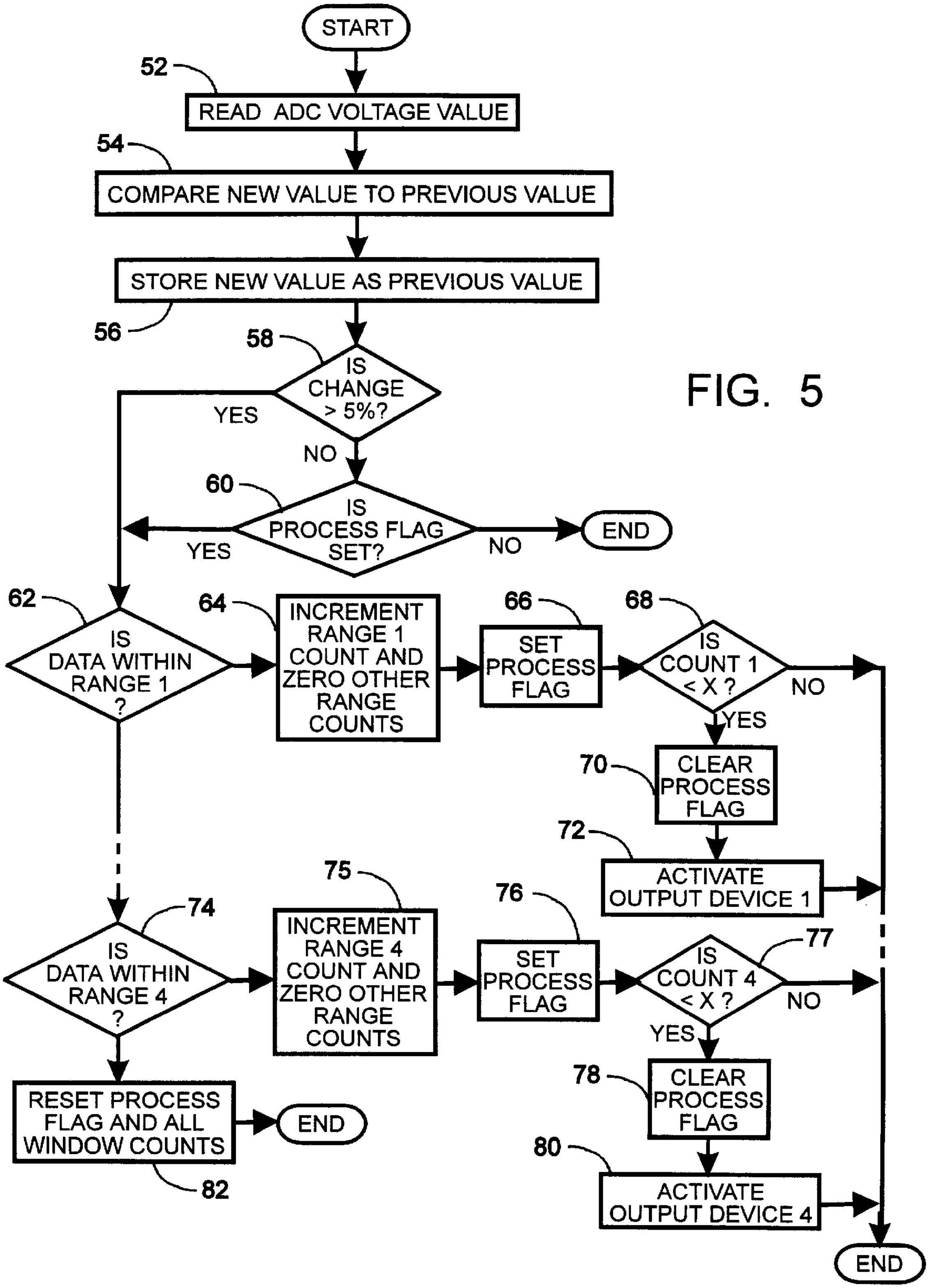
FIG. 5 is a flow chart of a computer routine executed by the microcomputer in FIG. 3 to interpret the voltage levels produced by the PID and determine which of several output devices should be activated.

With reference to FIG. 5, the timed interrupt routine commences at step 52 by reading the present voltage level from the analog to digital converter 36. Next, at step 54 the microcomputer 38 compares that present voltage level to a previously acquired voltage level. This comparison calculates the difference between the two voltage levels and the percentage of any change which has occurred, either an increasing or decreasing change. Next, at step 56 the present voltage level is stored in memory 40 as the value for the previous voltage level, which will be used at step 54 upon the next execution of the interrupt routine when another voltage level has been acquired.

At step 58 a determination is made by the microcomputer 38 whether the voltage produces by the PID 20 has changed, either increased or decreased, by greater than a five percent for example. If that magnitude of change has occurred, it is likely that the user has changed the position of the selector lever 18 and the program execution branches to step 62 to determine that new position.

However, if no change is detected or the change is less than five percent for example, the program execution branches from step 58 to step 60 where a process flag, stored in the microcomputer memory, is checked to determine whether the flag is set. To avoid spurious voltage variations from being considered as indicating a change in the position of the selector lever 18, the input voltage produced by the PID 20 must remain within one of the four voltage ranges 46–49 for a given number of samples (e.g. three) before the control system 30 concludes that the user changed the position of selector switch 10. The process flag indicates that a significant change was detected previously and now the control circuit 30 is waiting for the voltage level produced by the PID 20 to remain within one voltage range for that given number of samples. If the process flag was not found to be set at step 60 and a significant change in the input did not occur as determined at step 58, the program execution terminates following the processing at step 60.

However, if either a significant change, greater than five percent for example, was found at step 58 or the process flag was found set at step 60, the program execution advances to step 62. At this time the microcomputer 38 compares the present voltage level from the ADC 36 to lower and upper voltage thresholds that define boundaries of the first voltage range 46 to determine whether the present voltage level is within that range. If so, the program execution advances to step 64 where a count for the first range is incremented to tally the number of consecutive voltage levels from the analog to digital converter 36 that are found to be within the first voltage range 46. Any other voltage range counts stored in the microcomputer 38 are zeroed at the same time. Next, the program advances to step 66 where the process flag is set. Thereafter, at step 68 a determination is made whether the count for the first voltage range 46 is below the required number of samples (X) before determining that the selector lever 18 is in a new position. For example, the program may require that three consecutive samples be within a given voltage range (X=3), and until that occurs, the program execution terminates after step 68. Upon finding the requisite number of consecutive samples that are within the first voltage range 46, the program execution branches from step 68 to step 70 where the microcomputer 38 clears the process flag before issuing an output signal at step 72 which activates the first output device 41. Any other output device 42–44 that was active previously now is deactivated. This activation is accomplished by the microcomputer 38 setting the bit line of the parallel port 39 that is connected to the first output device 41 and resets the other bit lines.

If at step 62 the present voltage level from the analog to digital converter 36 was found not to be within the first voltage range 46, the program execution branches another group of steps (not shown) which are similar to steps 62–72, but for the second output device 42. Similar sets of steps exist for the remaining positions of the selector lever 18, and the corresponding voltage ranges 47–49 and output devices 42–44, such as steps 74–80 for the fourth lever position and the fourth output device 44. If the input voltage is not within any of the defined voltage ranges 46–49, the interrupt routine ultimately advances to step 82 where the process flag is reset and all of the voltage range counts are set to zero. This clears any previous processing by the interrupt routine.

For example, the present selector device may be utilized to control a motorized window of a motor vehicle. In this application the positions of the selector lever 18 on one side of the center produce operation the electric motor to move the window downward, whereas the two positions on the opposite side of center cause the window to move the upward. In each direction, one position is utilized for normal operation and the other for express operation. The control circuit, instead of driving four separate output devices 41–44, is connected to four inputs of the window motor controller to control the direction and the relative speed that the motor should operate the window. Thus, depending upon the position of the lever 18, the control circuit 30 applies an activation signal to the appropriate window motor controller input in place of a conventional contact-type selector switch.

In light of the description above, one will appreciate that the output devices 41–44 may comprise separate physical devices for performing different functions or they may be different inputs to the same mechanism for placing that mechanism into different operational states.

Figure 6:
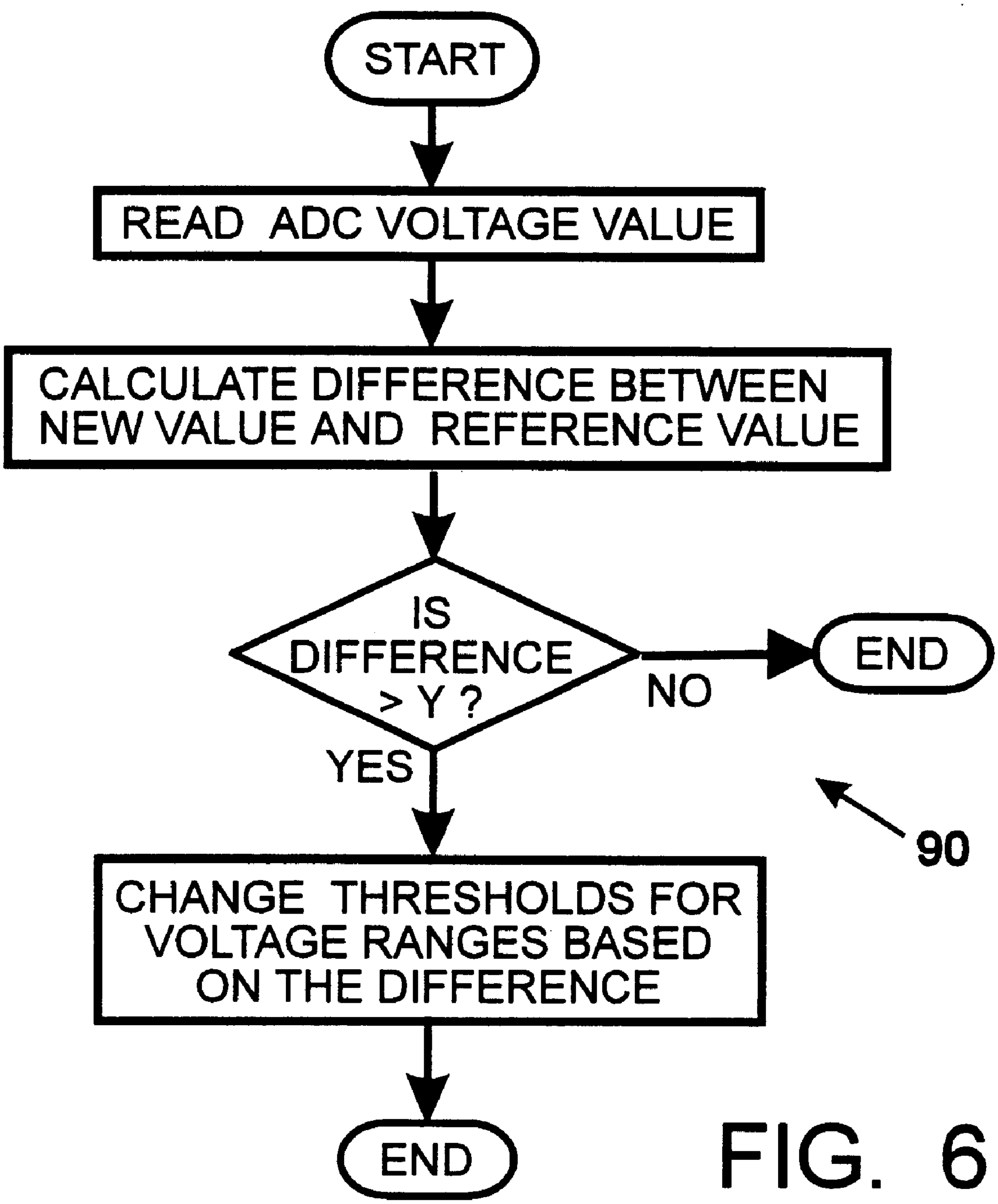
FIG. 6 is a flow chart of a computer routine that is executed by the microcomputer to calibrate the control circuit.

As noted previously the resistance of the PID 20 and thus the voltage produced at node 34 may vary with changes in the supply voltage $V^+$ and in environmental conditions, such as temperature and humidity. The microcomputer can periodically execute a calibration routine, such as the one depicted in FIG. 6, that senses drift in the performance of the PID and then alters the thresholds that define the voltage ranges 41–44 as a compensation measure.

For example, the calibration routine 90 may be executed every time the user starts the motor vehicle which is when power is applied to the control circuit 30. At that time, the selector lever 18 usually will be in the center position. Although in that position pressure is not being application to the PID 20 by the selector lever 18 and actuator member 22, the PID has a finite, albeit very high, resistance which results in a small yet discernable voltage being produced at node 34. Thus the microcomputer 38 receives a voltage value from the ADC 36 at this time. Execution of the calibration routine 90 causes the microcomputer 38 to compare this input voltage level to a reference value stored in memory, along with the initial set of thresholds that defined the voltage ranges 46–49, during initial configuration of the control circuit 30 by the manufacturer. The amount and direction of deviation of the input voltage level from the reference value indicates how the PID operation has drifted and how the voltage range thresholds need to be adjusted to ensure that the positions of the selector lever 18 can be discerned by the control circuit 30.

The foregoing description is directed primarily to preferred embodiments of the invention. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure.

What is claimed is:

1. An electrical multiple function selector switch assembly comprising:

a pressure transducer having an impedance which changes in response to pressure applied to the pressure transducer;

a member that applies varying pressure to the pressure transducer when the member is operated by a user;

a circuit connected to the pressure transducer for producing an electrical signal which in response to the impedance of the pressure transducer has a plurality of discrete states which indicate a plurality of functions which the user is able to select.

2. The electrical multiple function selector switch assembly as recited in claim 1 wherein the resistance of the pressure transducer changes in response to pressure.

3. The electrical multiple function selector switch assembly as recited in claim 2 wherein the circuit comprises an input section which produces an output voltage that varies with changes in the resistance of the pressure transducer.

4. The electrical multiple function selector switch assembly as recited in claim 3 wherein the circuit further comprises a voltage comparator connected to the input circuit to compare the output voltage to a plurality of voltage thresholds which correspond to the plurality of functions which the user is able to select.

5. The electrical multiple function selector switch assembly as recited in claim 4 further comprising a calibrator which compares the output voltage to a reference value and adjusts at least one of the plurality of voltage thresholds in response to that comparison.

6. An electrical switch assembly by which a user selects one of a plurality of functions, said electrical switch assembly comprising:

a pressure transducer having an impedance which changes in response to pressure applied thereto;

a user operable member that applies varying pressure to the pressure transducer when operated by a user;

an input circuit connected to the pressure transducer for producing an output voltage which varies in relation to changes in the impedance of the pressure transducer;

a voltage comparator connected to the input circuit to compare the output voltage to a plurality of voltage thresholds; and an output driver coupled to the voltage comparator for producing at least one electrical signal which in response to the impedance of the pressure transducer indicates which one of plurality of functions the user has selected.

7. The electrical multiple function selector switch assembly as recited in claim 6 wherein the voltage comparator determines whether the output voltage is within one of a plurality of voltage ranges.

8. The electrical multiple function selector switch assembly as recited in claim 7 wherein the plurality of voltage ranges are discontinuous.

9. The electrical multiple function selector switch assembly as recited in claim 6 wherein the voltage comparator determines whether the output voltage is within one of a plurality of voltage ranges by comparing the output voltage to a lower threshold and an upper threshold for each voltage range.

10. The electrical multiple function selector switch assembly as recited in claim 6 wherein the output driver produces a plurality of output signals each indicating a different function to be performed.

11. The electrical multiple function selector switch assembly as recited in claim 6 further comprising a calibrator which compares the output voltage to a reference value and adjusts the plurality of voltage thresholds in response to that comparison.

12. A method for electrically selecting among a plurality of functions, said method comprising steps of:

manually activating a member coupled to a pressure transducer which applies pressure that varies an impedance of the pressure transducer;

sensing the impedance of the pressure transducer; and in response to sensing the impedance, producing an electrical signal which has a given one of a plurality of discrete states which thereby indicates a selected one of the plurality of functions.

13. The method as recited in claim 12 wherein the step of sensing the impedance comprises producing a voltage which varies in relation to variation of the impedance of the pressure transducer; and the step of producing an electrical signal comprises comparing the voltage to at least one threshold to determine the a given one of a plurality of discrete states for the electrical signal.

14. The method as recited in claim 13 wherein the step of producing an electrical signal further comprises producing a signal on one of a plurality of output lines depending upon the function to be preformed.

15. The method as recited in claim 12 wherein:

the step of sensing the impedance comprises producing a voltage which varies in relation to variation of the impedance of the pressure transducer; and the step of producing an electrical signal comprises comparing the voltage to at a plurality of voltage ranges to determine the a given one of a plurality of discrete states for the electrical signal.

* * * * *